US006500471B2

(12) United States Patent
Sato et al.

(10) Patent No.: US 6,500,471 B2
(45) Date of Patent: Dec. 31, 2002

(54) METHOD OF RAISING EDIBLE ANIMALS

(75) Inventors: Minoru Sato, Miyagi-ken (JP);
Naohiko Sato, 32-14, Chofugaoka 2-chome, Chofu-shi, Tokyo (JP)

(73) Assignee: Naohiko Sato, Tokyo (JP)

( * ) Notice: Subject to any disclaimer, the term of this patent is extended or adjusted under 35 U.S.C. 154(b) by 0 days.

(21) Appl. No.: 09/729,378

(22) Filed: Dec. 4, 2000

(65) Prior Publication Data

US 2001/0003592 A1 Jun. 14, 2001

(30) Foreign Application Priority Data

Dec. 6, 1999 (JP) .......................... 11-345596

(51) Int. Cl.⁷ ............................... A23K 1/00
(52) U.S. Cl. ..................... 426/2; 426/615; 426/807
(58) Field of Search .................. 426/2, 615, 807

(56) References Cited

U.S. PATENT DOCUMENTS

| 4,556,564 A | * | 12/1985 | Laurent et al. ............... 426/2 |
| 4,911,944 A | * | 3/1990 | Holub ....................... 426/635 |
| 5,250,300 A | | 10/1993 | Dozono ................... 424/195.1 |
| 5,250,301 A | | 10/1993 | Dozono ................... 424/195.1 |
| 5,262,161 A | | 11/1993 | Dozono ................... 424/195.1 |
| 5,487,903 A | * | 1/1996 | Yokoyama et al. ........... 426/56 |
| 5,851,572 A | * | 12/1998 | Cook et al. ................... 426/2 |
| 5,928,689 A | * | 7/1999 | Milkowski et al. ........... 426/56 |
| 5,958,419 A | * | 9/1999 | Sato et al. ............... 424/195.1 |

FOREIGN PATENT DOCUMENTS

| EP | 0880894 | 12/1998 |
| JP | 62-108790 | 5/1987 |
| JP | 62-108791 | 5/1987 |
| JP | 03177386 | 8/1991 |
| JP | 10-094382 | 4/1998 |
| JP | 11-089539 | 4/1999 |
| JP | 11092410 | 4/1999 |
| JP | 11-289994 | 10/1999 |

* cited by examiner

Primary Examiner—Chhaya D. Sayala
(74) Attorney, Agent, or Firm—Jordan and Hamburg LLP

(57) ABSTRACT

In a method of raising an edible animal, a finely pulverized product of a plant tissue of Stevia is added to feed in an amount of 0.5% to 7% by weight, thereby preventing exudation of meat juice from meat of the edible animal, decreasing fat content without turning meat of the edible animal stale, producing DHA-containing meat of the edible animal, or preventing an egg of the fowl (preferably, a hen's egg) from being broken.

15 Claims, No Drawings

METHOD OF RAISING EDIBLE ANIMALS

FIELD OF THE INVENTION

The present invention relates to a method for raising edible animals such as edible domestic animals and hatchery fish, wherein a dried fine powder of plant tissues such as stems and leaves of Stevia is added to feed in small amounts. Fish meat and domestic animal meat of the animals raised by the method of the invention has a reduced exudation of meat juice when stored, thus being able to provide goodtasting, excellent edible meat. Further, when fowls are raised by the method of the invention, eggs thereof are prevented from being broken.

BACKGROUND OF THE INVENTION

It is known that Stevia leaves contain strong sweetening components such as stevioside and rebaudioside. On the other hand, Japanese Unexamined Patent Publication (TOKU KAI SHO) No. 62-108790 (1987) discloses that addition of a fine Stevia powder in which a Stevia leaf powder was mixed with a Stevia stem powder at a ratio of 10% to 40% to feed for cattle, horse and swine caused production of fat-rich, concentrated, good-tasting milk in milk cows. Japanese Examined Patent Publication (TOKU KO HEI) No. 7-13022 discloses medicines containing as active ingredients fermented, concentrated solutions extracted from Stevia stems for treating disorders of digestive organs of domestic animals and for improving physical conditions thereof, which treat adaptive diseases, oligopepsia, hyperacidity, diarrhea, loose feces, gingivostomatitis, constipation and intestinal disorders, increase digestion and appetite, and improve hair gloss, meat quality, milk quality, estrus and occurrence of menstruation, by drinking. As materials to be added to feed, fermented Stevia solutions have been used, active ingredients of which have been extracted from stems of Stevia with boiling water and fermented over a period of half a year or more. This takes a lot of labor and time, naturally resulting in an increase in cost to cause unsuitable use as feed for industrial animals.

SUMMARY OF THE INVENTION

Then, finely pulverized products of the whole plant tissues of Stevia including stems and leaves have been studied. The studies have revealed effects not taught in the prior art, such as a reduction in exudation of meat juice of fish meat or domestic animal meat, keeping of freshness, retardation of putrefaction and prevention of egg breakage.

According to the present invention, there is provided a method for raising an edible animal, in which a finely pulverized product of a plant tissue of Stevia is added to feed in an amount of 0.5% to 7% by weight, thereby preventing exudation of meat juice from meat of the edible animal, decreasing fat content without turning meat of the edible animal stale, producing DHA-containing meat of the edible animal, or preventing an egg of a fowl (preferably, a hen's egg) from being broken.

The present invention further provides a feed additive for domestic animals, domestic fowls and hatchery fish, which comprises a dried, finely pulverized product of a plant tissue of Stevia, and preferably further comprises an organic acid in addition to the dried, finely pulverized product of the plant tissue of Stevia.

DETAILED DESCRIPTION OF THE INVENTION

The present inventor has discovered the fact that exudation of meat juice is reduced in cuts of meat and the taste thereof is also improved, by adding a dried, finely pulverized product of a plant tissue of Stevia to feed for hatchery fish and domestic animals such as cattle, horse and swine in an amount of 10% by weight or less, preferably 2% to 3% by weight, thus completing the invention. This phenomenon has been observed in domestic animal meat, but also in fish meat. Exudation of meat juice from the resulting fish meat has also been reduced by raising fish, and giving feed to hatchery fish containing a dried, finely pulverized product of a plant tissue of Stevia. Domestic animal meat having a low fat content can be obtained without turning the meat stale. Further, DHA (docosahexaenoic acid) has been detected from the domestic animal meat obtained by the invention. There is no precedent that DHA is detected from meat of domestic animals such as swine.

Previously, 10% to 15% of eggs have been broken until eggshells are solidified after fowls have laid the eggs. This is a serious loss to the poultry raising industry. Accordingly, calcium-rich feed is given for reducing the breaking ratio of eggs. However, calcium metabolism does not catch up to egg production in the present state that the egg production rate is increased to near the extreme limit. There is therefore a limit on a decrease in the breaking ratio of eggs. Even if a large amount of a calcium ingredient is added to feed, it does not contribute to a decrease in the breaking ratio of eggs when added in an amount exceeding a certain value. It has therefore been considered that the physiology of hens cannot be adapted to the present mass egg production with respect to the calcium ingredient.

However, when the edible animals are raised and given feed to which the fine powder of Stevia is added, the breaking ratio of eggs has successfully been reduced to 2% to 3% without decreasing the number of laid eggs. Although the active ingredients of the finely pulverized products of Stevia used in the invention are not specified, they are considered to have a function of enhancing calcium metabolism, deducing from the effect.

Stevia used as a raw material in the invention is a perennial plant of Compositae (Asteraceae), which is native to South America and called Stevia Rebaudiana Bertoni, and includes its relative plants. Experiments have indicated that the active ingredients are contained in grown plant tissues, preferably in the whole plant tissues before bearing of buds, and in particular are contained in stems and leaves. The active ingredients are also contained in roots and young plants, in which they are contained in an amount of about ⅕ to about 1/10 the weight of stems. For obtaining the finely pulverized products of Stevia, portions above the ground of grown Stevia, preferably Stevia before the bearing of buds, are harvested, dried and finely pulverized. There is no limitation on the method for drying and finely pulverizing them, as long as they are dried without being exposed to the rain or dew. In general, stems are separated from leaves and cut. The stems and the leaves are finely pulverized separately. A method of finely pulverizing them after drying is generally efficient. They are dried to a water content of 12% or less, preferably 10.5% or less, and finely pulverized to a particle size of 100 μm or less, preferably 50 μm or less. In general, smaller particle size results in effective utilization of the active principle. For easy handling, the fine powder may be granulated into granules.

When an organic acid is added to the fine Stevia powder thus obtained, the effects are more heightened. The organic acids include lactic acid, citric acid, tartaric acid, succinic acid, malic acid and propionic acid. Although cattle and horses are herbivorous animals, there is recently a tendency to give high-fat feed to them in a state that the feed does not load the rumen, such as rumen bypass, for accelerating the growth of them. When the finely pulverized products of the plant tissues of Stevia are used, they are added to feed for cattle, swine, fowls and horse. Further, they are also preferably used as feed additives for hatchery fish such as trout, young yellowtails and eels.

Although the amount of the fine Stevia powder used varies depending on the kind of animal, the degree of growth and the purpose, it is generally from 0.5% to 7% by weight, and preferably from 1% to 5% by weight, based on feed. Less than 0.5% by weight results in insufficient exhibition of the effects of the fine Stevia powder, whereas exceeding 7% by weight leads to no observation of the effects proportional to the amount of the fine Stevia powder added.

EXAMPLE 1
(Production of Stevia Powder)

Portions over the ground of Stevia before bearing of buds were harvested. They are air dried, and stems were separated from leaves. The stems were cut, further air dried, and placed in a pulverizer equipped with a rotary cutter to pulverize them. Only one-step treatment in the pulverizer could not provide fine particles sufficiently pulverized, so that a two-step pulverizing treatment was conducted in this example to obtain a finely pulverized product having a particle size of 20 μm to 30 μm.

The leaves were finely pulverized in the pulverizer equipped with the rotary cutter after separation from the stem. The finely pulverized products of the stems and the leaves were mixed so as to give a stem:leaf weight ratio of about 8:2.

EXAMPLE 2
(Test of Raising of Pigs)

Three mother pigs delivered nine baby pigs, twelve baby pigs and thirteen baby pigs, respectively, on the same day. A baby pig born early had a body weight of 1 kg or more, whereas a baby pig born late had a body weight as light as 400 g to 500 g, although they were born on the same day and from the same mother. These thirty-four baby pigs were divided into groups A and B. Groups A and B each consisted of seventeen baby pigs, and the average body weight was 748 g for group A and 735 g for group B.

Groups A and B were both raised by giving good-quality feed containing 4% by weight of fish meal, from weaning until the body weight reached about 10 kg, and by giving feed containing 2.5% by weight of fish meal, from a body weight of 20 kg to shipment. For group A, 2% by weight of the fine Stevia powder was added to the feed, and for group B, the fine Stevia powder was not added.

Three baby pigs of group B and four baby pigs of group A were extremely light in body weight. All of the three small baby pigs of group B died before the body weight of them reached 20 kg. The four baby pigs of group A thereafter satisfactorily grew, and could be shipped after about six months. The pigs were shipped when the body weight thereof reached 30 kg. The average time taken to reach this body weight was five months and twenty-one days for the pigs of group A, whereas it was six months and two days for the pigs of group B.

EXAMPLE 3
(Quality Tests of Pork)

Loin of a pig of group A (having a body weight of 30.8 kg when slaughtered) and loin of a pig of group B (having a body weight of 31.1 kg when slaughtered), both pigs being slaughtered on the same day, were taken as sample A and sample B, respectively. After slaughter, both samples were stored in the dark at 6° C., and the following tests were conducted after two days.

(A) Drip Amount

Each sample having a weight shown in Table 1 was allowed to stand in a room at ordinary temperature, and the weight of each sample was measured two days after standing (four days after slaughter). The drip amount was calculated from a decrease in weight, and shown in Table 1, together with the apparent presence or absence of drips.

As is apparent from Table 1, the amount of drips exuded from sample A after a further two days was small, and seemingly, no drips were observed, although the test was initiated after an elapse of two days after slaughter. In contrast, drips were exuded from sample B in large amounts.

TABLE 1

| Sample | 2 Days (g) | 4 Days (g) | Decrease in Weight (g) | Drips (%) | Drips | Reference |
|---|---|---|---|---|---|---|
| A-1 | 5.85 | 5.80 | 0.05 | 0.86 | Not observed | Example |
| A-2 | 5.75 | 5.70 | 0.05 | 0.87 | Not observed | Example |
| B-1 | 6.82 | 6.54 | 0.28 | 4.1 | Observed | Comparative Example |
| B-2 | 5.38 | 5.23 | 0.15 | 2.8 | Observed | Comparative Example |

(B) Interstitial Area Ratio

Two days after slaughter and four days after slaughter, sample A and sample B were fixed, sliced and dyed by conventional methods to prepare preparations, which were subjected to microscopic examination. The ratio of cell area to intercellular connective tissue area was measured, and the interstitial area ratio was calculated therefrom. Results thereof are shown in Table 2. A small change in the interstitial area ratio between two days after slaughter and four days after slaughter means that a tissue of the lump of meat itself is tight, and that deterioration of taste proceeds slowly.

TABLE 2

| Sample | 2 Days after Slaughter | 4 Days after Slaughter | Reference |
|---|---|---|---|
| A-1 | 34.18 | 34.52 | Example |
| A-2 | 34.54 | 34.40 | Example |
| B-1 | 26.53 | 31.12 | Comparative Example |
| B-2 | 26.09 | 27.49 | Comparative Example |

EXAMPLE 4
(Measurement of DHA in Lard)

For example A, crude lard was measured by the Soxlet extraction. As a result, 19.8 g/100 g of lipid was detected in a loin site. Fatty acids contained in the lard are shown in Table 3. In Table 3, 22:6 means DHA, and the existence of a highly unsaturated fatty acid such as 22:5 (n−3) in animal meat is a phenomenon that has never been seen. Highly unsaturated fatty acids including DHA were not detected from fatty acids of sample B. Fish meat is generally low fat, and DHA is a component mainly contained in fish oil. It is therefore considered that the amount of DHA added to the feed in the invention was extremely slight. However, it is presumed that the use of feed to which fish oil having high DHA content is added will make it possible to produce DHA rich domestic animal meat.

In Table 3, for example, 18:3 (n−3) means linolenic acid in which "18" means the number of carbon atoms in a fatty acid molecule, "3" means the number of unsaturated bonds in a molecule, and "n–3" means the position of carbon atoms counted from the $CH_3$—group where the unsaturated bond begins. The other fatty acids are similarly expressed.

TABLE 3

Composition of Fatty Acids in Loin Lard

| Composition of Fatty Acids | Content (%) |
|---|---|
| 14:0 (Myristic acid) | 1.3 |
| 16:0 (Palmitic acid) | 23.2 |
| 16:1 (Palmitoleic acid) | 1.7 |
| 17:0 (Heptadecanoic acid) | 0.5 |
| 17:1 (Heptadecenoic acid) | 0.3 |
| 18:0 (Stearic acid) | 15.1 |
| 18:1 (Oleic acid) | 42.9 |
| 18:2 (Linoleic acid) | 11.7 |
| 18:3 (n-3) (Linolenic acid) | 0.6 |
| 20:0 (Arachidic acid) | 0.3 |
| 20:1 | 0.8 |
| 20:2 (n-6) | 0.6 |
| 20:4 (n-6) | 0.3 |
| 22:5 (n-3) | 0.2 |
| 22:6 (DHA) | 0.2 |
| Not identified | 0.3 |

EXAMPLE 5
(Test for Decreasing Fat Content)

After weaning, five calves were raised by giving feed to which 3% by weight of the Stevia powder was added, and the content of the Stevia powder in the feed was increased to 6% by weight from one month before shipment. These calves were taken as group A. For comparison, four calves after weaning were raised in the same manner as described above with the exception that no Stevia powder was added to the feed. These calves were taken as group B. When shipped, the calves of group A had an oil layer of 1 cm to 1.5 cm, whereas the calves of group B had an oil layer of 2.5 cm to 3 cm. Meat of group A was tender and juicy, in spite of its low fat content.

EXAMPLE 6
(Raising of Hens for Egg Production)

Chickens were raised. The chickens begin to lay eggs about 120 days after birth. Accordingly, from that time, each of the chickens was raised in a cage in a state where it was hardly movable. An egg collecting chute having a length of about 25 cm and slightly inclined was disposed under its caudal ovipositor, and a belt conveyer was installed under the chute, thereby collecting eggs. As an experimental plot, forty-eight chickens were used, and 2.8% by weight of the Stevia powder of the invention was added to usual feed in which corn, wheat and various vitamins were compounded. The calcium content of this feed was 3.1 wt. % calculated as CaO. The chickens each laid one egg per day in average. However, some chickens each laid one egg every two days. The breaking ratio of eggs was 2.873% on the average for three days. The chickens during egg production each ate 110 g per day of the feed on average.

For comparison, fifty-nine chickens of the same kind were raised and allowed to lay eggs in the same manner as described above with the exception that no Stevia powder was added to the feed. For the egg laying rate, no significant difference was observed between both. However, the breaking ratio of eggs was 12.35% on the average for three days. The effect of the invention is also observed in eggs of quails and other fowls.

What is claimed is:

1. A method for strengthening a shell of an egg of a fowl to inhibit breakage thereof, comprising raising the fowl on a feed comprising a finely pulverized product of a plant tissue of Stevia in an amount of about 0.5% to about 7% by weight.

2. A method according to claim 1, wherein the fowl is a chicken.

3. A method of reducing a breaking ratio of eggs produced by a fowl, comprising:

preparing a feed comprising a finely pulverized product of a plant tissue of Stevia; and feeding the fowl said feed.

4. A method according to claim 3, wherein said feed produced in step of preparing includes the finely pulverized product in an amount ranging from about 0.5% to about 7% by weight.

5. A method according to claim 3, wherein said feed produced in step of preparing includes the finely pulverized product in an amount ranging from about 1% to about 5% by weight.

6. A method according to claim 3, wherein said finely pulverized product includes a particle size not to exceed about 100 μm.

7. A method according to claim 3, wherein said finely pulverized product includes a particle size not to exceed about 50 μm.

8. A method according to claim 3, further comprising producing the finely pulverized product prior to said step of preparing, said step of producing includes drying and pulverizing the plant tissue of Stevia.

9. A method according to claim 8, wherein said step of drying includes reducing a water content to no greater than about 12%.

10. A method according to claim 8, wherein said step of drying includes reducing a water content to no greater than about 10.5%.

11. A method according to claim 8, wherein said step of pulverizing include a two-step pulverizing treatment.

12. A method according to claim 3, further comprising harvesting the Stevia before bearing of buds thereby.

13. A method according to claim 3, further comprising granulating said finely pulverized product into granules.

14. A method according to claim 3, wherein the fowl includes a chicken.

15. A method according to claim 3, wherein said feed includes calcium.

* * * * *